(12) United States Patent  
Riley et al.

(10) Patent No.: US 7,830,993 B2
(45) Date of Patent: Nov. 9, 2010

(54) SAMPLE DECIMATION IN A GNSS RECEIVER

(75) Inventors: Stuart Riley, San Jose, CA (US); Andrew Peter John Cartmell, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 310 days.

(21) Appl. No.: 12/070,744

(22) Filed: Feb. 20, 2008

(65) Prior Publication Data

US 2009/0207075 A1 Aug. 20, 2009

(51) Int. Cl.
*H04L 27/08* (2006.01)
*H04B 7/10* (2006.01)

(52) U.S. Cl. ...................... 375/345; 375/347
(58) Field of Classification Search ............ 342/357.12; 375/345, 347
See application file for complete search history.

(56) References Cited

U.S. PATENT DOCUMENTS

| 7,321,754 | B2 | 1/2008 | Zellweger et al. |
| 2002/0004708 | A1 | 1/2002 | Farine et al. |
| 2005/0185700 | A1 | 8/2005 | Pietila et al. |
| 2006/0227905 | A1* | 10/2006 | Kunysz et al. ............. 375/345 |
| 2007/0096980 | A1 | 5/2007 | Gradincic et al. |
| 2007/0274374 | A1* | 11/2007 | Abraham ................... 375/148 |

* cited by examiner

*Primary Examiner*—Thomas H Tarcza
*Assistant Examiner*—Harry Liu

(57) ABSTRACT

Embodiments of the present invention recite a method and system for processing Global Navigation Satellite System (GNSS) signals. In one embodiment, at least one wide-band Radio Frequency (R/F) filter of a signal processing pathway is utilized to pass a plurality of signals from a plurality of satellite navigation systems as a combined signal set. The plurality of signals of the plurality of satellite navigation systems is split based upon the respective frequency of each of the plurality of signals to facilitate reducing the clock rate used to subsequently process each of the plurality of signals.

22 Claims, 8 Drawing Sheets

SAMPLE DECIMATION IN A GNSS RECEIVER

TECHNICAL FIELD

Embodiments in accordance with the present invention generally pertain to navigation devices.

BACKGROUND

Recent technology trends have allowed the reduction in size of integrated circuits which are used as microprocessors, data storage devices, etc. An added benefit of such size reduction is a typical reduction in the amount of power needed to operate devices utilizing these integrated circuits. However, similar reductions in the size of other types of circuits have not been realized. Thus, while the reduction of the integrated circuit facilitates reducing the size of devices which use them, other circuitry in the device may limit the size reduction of the device. This is especially important in the growing field of mobile electronic devices. More specifically, because of the reduction in the size of circuitry, more features are being integrated into increasingly smaller devices.

One feature which is increasingly integrated into mobile electronic devices are implementations of the Global Navigation Satellite System (GNSS) which uses radio signals from orbiting satellites to determine the geographic position of a GNSS receiver. However, the size of the radio signal processing circuitry has not been reduced at the same rate as the digital processing circuitry. Thus, integrating GNSS systems may not be desirable for devices in which size reduction is the primary concern.

SUMMARY OF THE INVENTION

Embodiments of the present invention recite a method and system for processing Global Navigation Satellite System (GNSS) signals. In one embodiment, at least one wide-band Radio Frequency (R/F) filter of a signal processing pathway is utilized to pass a plurality of signals from a plurality of satellite navigation systems as a combined signal set. The plurality of signals of the plurality of satellite navigation systems is split based upon the respective frequency of each of the plurality of signals to facilitate reducing the clock rate used to subsequently process each of the plurality of signals.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Figure 1:
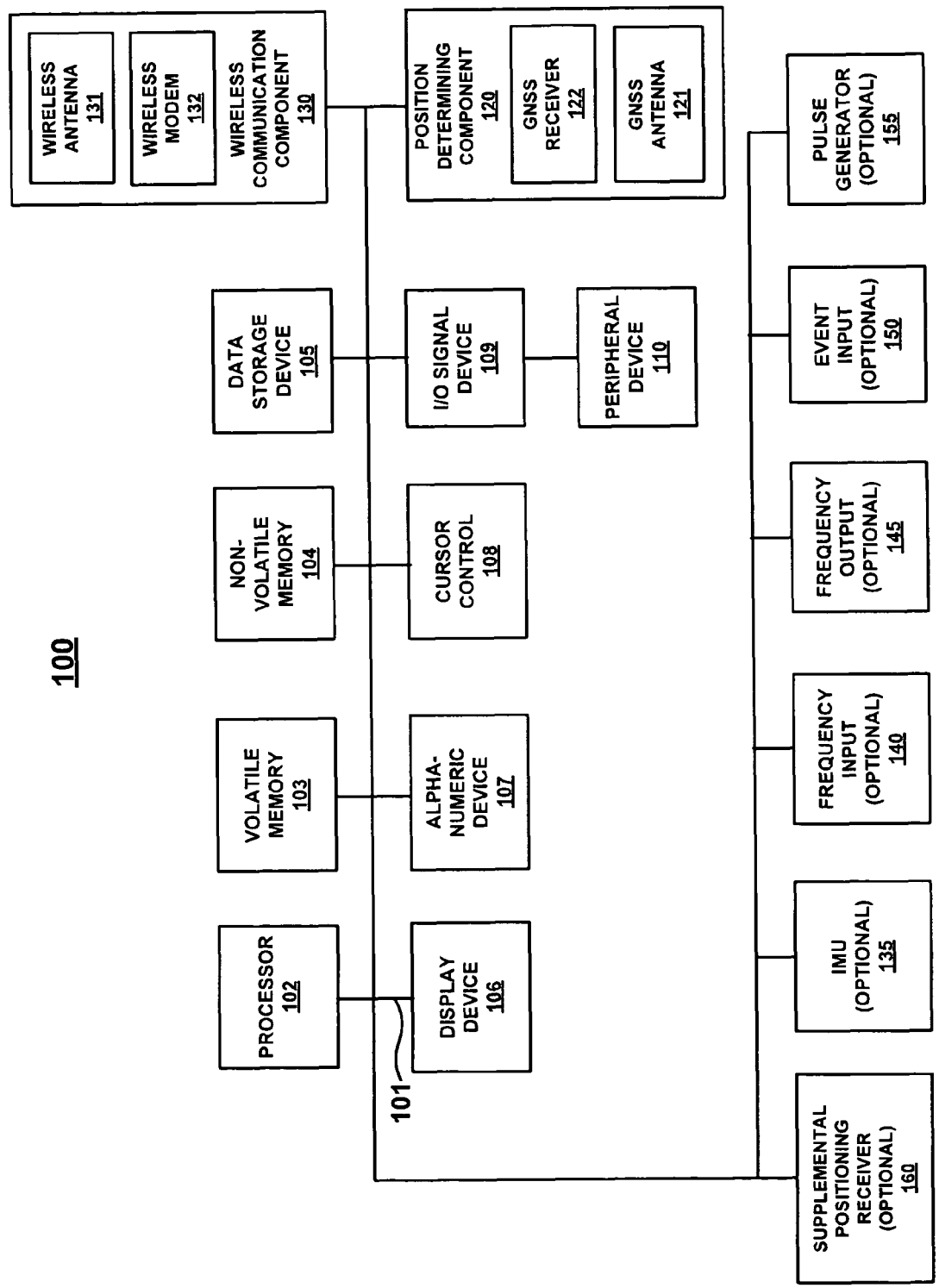
FIG. 1 is a block diagram of an exemplary electronic device in accordance with embodiments of the present invention.

FIG. 1 is a block diagram of an exemplary electronic device 100 in accordance with embodiments of the present invention. In embodiments of the present invention, electronic device 100 may comprise a dedicated GNSS device such as a surveying component, a Geographic Information Systems (GIS) data collector, an asset tracking system, a vehicle (e.g., automotive, aircraft, etc.) guidance system, a device controller, or a component thereof. In another embodiment, electronic device 100 may comprise a portable electronic device such as a Personal Digital Assistant, laptop computer, handheld computer system, digital camera, cellular telephone, or a wearable electronic device.

In the present embodiment, electronic device 100 comprises an address/data bus 101 for conveying digital information between the various components, a central processor unit (CPU) 102 for processing the digital information and instructions, a volatile main memory 103 is comprised of volatile random access memory (RAM) for storing the digital information and instructions, and a non-volatile read only memory (ROM) 104 for storing information and instructions of a more permanent nature. In addition, electronic device 100 may also include a data storage device 105 (e.g., a magnetic, optical, floppy, or tape drive or the like) for storing vast amounts of data. In one embodiment of the present invention, data storage device 105 comprises a removable data storage device.

Additional devices comprising electronic device 100 include a display device 106 for displaying information to a user, an optional alpha-numeric input device 107 (e.g., a keyboard), and an optional cursor control device 108 (e.g., mouse, trackball, light pen, etc.) for inputting data, selections, updates, etc. electronic device 100 can also include a mechanism for emitting an audible signal (not shown).

Returning still to FIG. 1, display device 106 of FIG. 1 may be a liquid crystal device, cathode ray tube, or other display device suitable for creating graphic images and alpha-numeric characters recognizable to a user. Cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices. In one embodiment of the present invention, electronic device 100 utilizes a touch
} screen display and therefore does not require alpha-numeric input device 107 or cursor control device 108 for user input.

Furthermore, electronic device 100 can include an input/output (I/O) signal device (e.g., interface) 109 for interfacing with a peripheral device 110 (e.g., a computer network, modem, mass storage device, etc.).

Position determining component 120 is for determining the location of electronic device 100. In embodiments of the present invention, position determining component 120 comprises a GNSS antenna 121 and a GNSS receiver 122. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 120 describes the latitude and longitude of electronic device 100. However, position determining component 120 may also determine the elevation of electronic device in embodiments of the present invention. As will be described in greater detail below, GNSS receiver 122 further comprises a plurality of signal processing pathways coupled with a signal decimator which reduces the area dedicated to receiving and processing GNSS navigation signals in one embodiment of the present invention.

An optional wireless communications component 130, comprising a wireless modem 132 and a wireless antenna 131, is also coupled with bus 101. Wireless communications component 130 is for transmitting and receiving wireless messages (e.g., data and/or commands). In embodiments of the present invention, wireless communication component 130 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, electronic device 100 sends and receives messages using the Short Message Service (SMS). However, the present invention is well suited to utilize other message formats as well.

In other embodiments of the present invention, wireless communications component 130 may comprise a Bluetooth wireless communications device, or another wireless communications device such as a Wi-Fi transceiver. Wi-Fi transceivers are often used to create local area networks between a computer and an Internet access point in public areas such as airports, coffee shops, libraries, and the like. Alternatively, many cellular telephone providers also provide wireless Internet services using communication devices known as "air cards" which refer to wireless communication devices which allow electronic devices to pick up wireless radio signals in a manner similar to a cellular telephone. One type of air card couples with a PCMCIA Type 2 card slot of a computer system and facilitates establishing a wireless Internet connection when installed. Thus, in one embodiment, wireless communication device 130 comprises an air card.

In the embodiment of FIG. 1, electronic device 100 further comprises an optional supplemental positioning receiver 160. In embodiments of the present invention, supplemental positioning receiver 160 utilizes signals from sources other than GNSS satellites to determine the geographic position of electronic device 100. In embodiments of the present invention, these signals include, but are not limited to cellular telephone signals, digital television signals, Long Range Radio Aid to Navigation (LORAN) signals, etc.

In the embodiment of FIG. 1, electronic device 100 further comprises an optional inertial measurement unit (IMU) 135. In embodiments of the present invention, inertial measurement unit 135 detects changes in the motion of electronic device 100 which can be used to determine the geographic position of electronic device 100. In one embodiment of the present invention, inertial measurement unit 135 utilizes a gyroscope to detect changes in the motion of electronic device 100. In another embodiment, inertial measurement unit 135 utilizes at least one accelerometer to detect changes in the motion of electronic device 100. It is noted that in one embodiment, an accelerometer capable of detecting a change of motion in more than one axis or plane of motion may be used by inertial measurement unit 135.

In the embodiment of FIG. 1, electronic device 100 also comprises an optional frequency input 140. In embodiments of the present invention, frequency input 140 receives a reference frequency output by a device (e.g., a GNSS reference station or atomic clock). Electronic device 100 may then synchronize to the frequency received by frequency input 140.

In the embodiment of FIG. 1, electronic device 100 also comprises an optional frequency output 145. In embodiments of the present invention, electronic device 100 may output a reference frequency which is used by other devices for synchronization as described above.

In the embodiment of FIG. 1, electronic device 100 also comprises an optional event input 150. In embodiments of the present invention, electronic device 100 can record an event and timestamp the event using event input 150.

In the embodiment of FIG. 1, electronic device 100 also comprises an optional pulse generator 155. In embodiments of the present invention, pulse generator 155 generates a one second pulse in response to a timestamp event initiated by event input 150. It is noted that the timing of the pulse generated by pulse generator 155 may have a higher or lower frequency than one pulse per second in embodiments of the present invention. Additionally, pulse generator 155 may generate some other trigger in response to a timestamp event in embodiments of the present invention.

Figure 2:
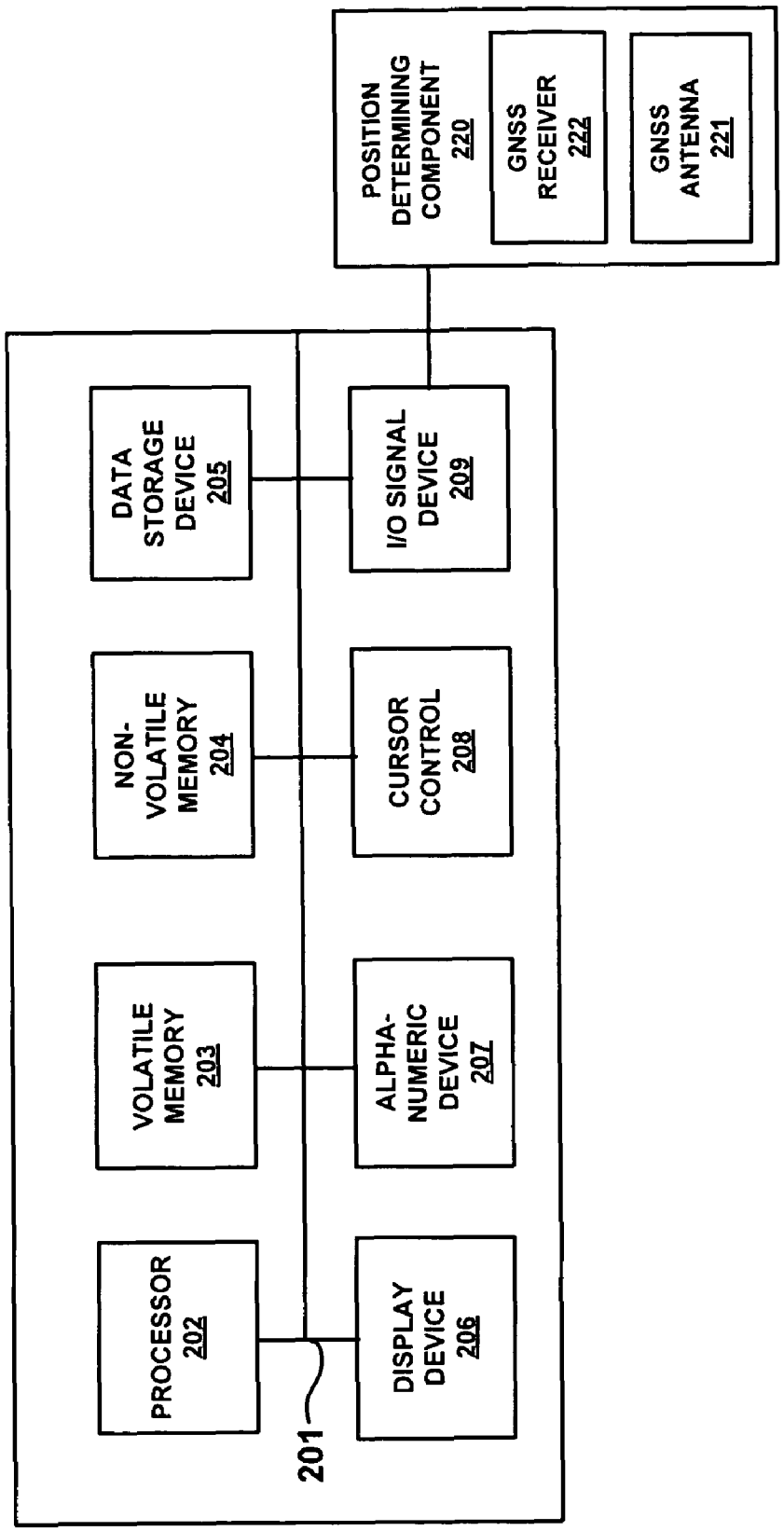
FIG. 2 is a block diagram of an exemplary electronic device in accordance with embodiments of the present invention.

FIG. 2 is a block diagram of an exemplary electronic device 200 which can be used in accordance with embodiments of the present invention. In the embodiment of FIG. 2, a peripheral device (e.g., position determining component 220) is coupled with electronic device 200 to provide additional functionality. In the present embodiment, electronic device 200 comprises an address/data bus 201 for conveying digital information between the various components, a central processor unit (CPU) 202 for processing the digital information and instructions, a volatile main memory 203 comprised of volatile random access memory (RAM) for storing the digital information and instructions, and a non-volatile read only memory (ROM) 204 for storing information and instructions of a more permanent nature. In addition, electronic device 200 may also include a data storage device 205 (e.g., a magnetic, optical, floppy, or tape drive or the like) for storing vast amounts of data Additional devices comprising electronic device 200 include a display device 206 for displaying information to a user, an optional alpha-numeric input device 207 (e.g., a keyboard), and an optional cursor control device 208 (e.g., mouse, trackball, light pen, etc.) for inputting data, selections, updates, etc. electronic device 200 can also include a mechanism for emitting an audible signal (not shown).

Returning still to FIG. 2, display device 206 of FIG. 2 may be a liquid crystal device, cathode ray tube, or other display device suitable for creating graphic images and alpha-numeric characters recognizable to a user. Cursor control device 208 allows the computer user to dynamically signal the two dimensional movement of a visible symbol (cursor) on a display screen of display device 206. Many implementations of cursor control device 208 are known in the art including a trackball, mouse, touch pad, joystick, or special keys on alpha-numeric input 207 capable of signaling movement of a given direction or manner displacement. Alternatively, it will be appreciated that a cursor can be directed and/or activated via input from alpha-numeric input 207 using special keys and key sequence commands. Alternatively, the cursor may be directed and/or activated via input from a number of specially adapted cursor directing devices. In one embodiment of the present invention, electronic device 200 utilizes a touch screen display and therefore does not require alpha-numeric input device 207 or cursor control device 208 for user input.

Furthermore, electronic device 200 can include an input/output (I/O) signal device (e.g., interface) 209 for interfacing with a peripheral device (e.g., position determining component 220). In embodiments of the present invention, interface 209 may comprise a wired (e.g., serial, parallel, USB, firewire, etc.) interface, or a wireless (e.g., optical, infrared, or radio interface). Examples of a radio interface used in accordance with embodiments of the present invention include, but are not limited to, a Bluetooth® interface, a Wi-Fi communication interface, and the like.

In the embodiment of FIG. 2, interface 209 is communicatively coupled with a peripheral position determining component 220 which is for determining the location of electronic device 200. In embodiments of the present invention, position determining component 220 comprises a GNSS antenna 221 and a GNSS receiver 222. However, while the present embodiment specifically recites a GNSS position determining component, embodiments of the present invention are well suited to utilize a variety of terrestrial-based and satellite-based position determining components as well. In embodiments of the present invention, the geographic position determined by position determining component 220 describes the latitude and longitude of electronic device 200. However, position determining component 220 may also determine the elevation of electronic device in embodiments of the present invention.

It is noted that position determining component 220 may optionally comprise additional components (not shown) such as a supplemental positioning receiver (e.g., 160 of FIG. 1, an IMU (e.g., 135 of FIG. 1), a frequency input (e.g., 140), a frequency output (e.g., 145 of FIG. 1), an event input (e.g., 150 of FIG. 1), and/or a pulse generator (e.g., 155 of FIG. 1).

Figure 3:
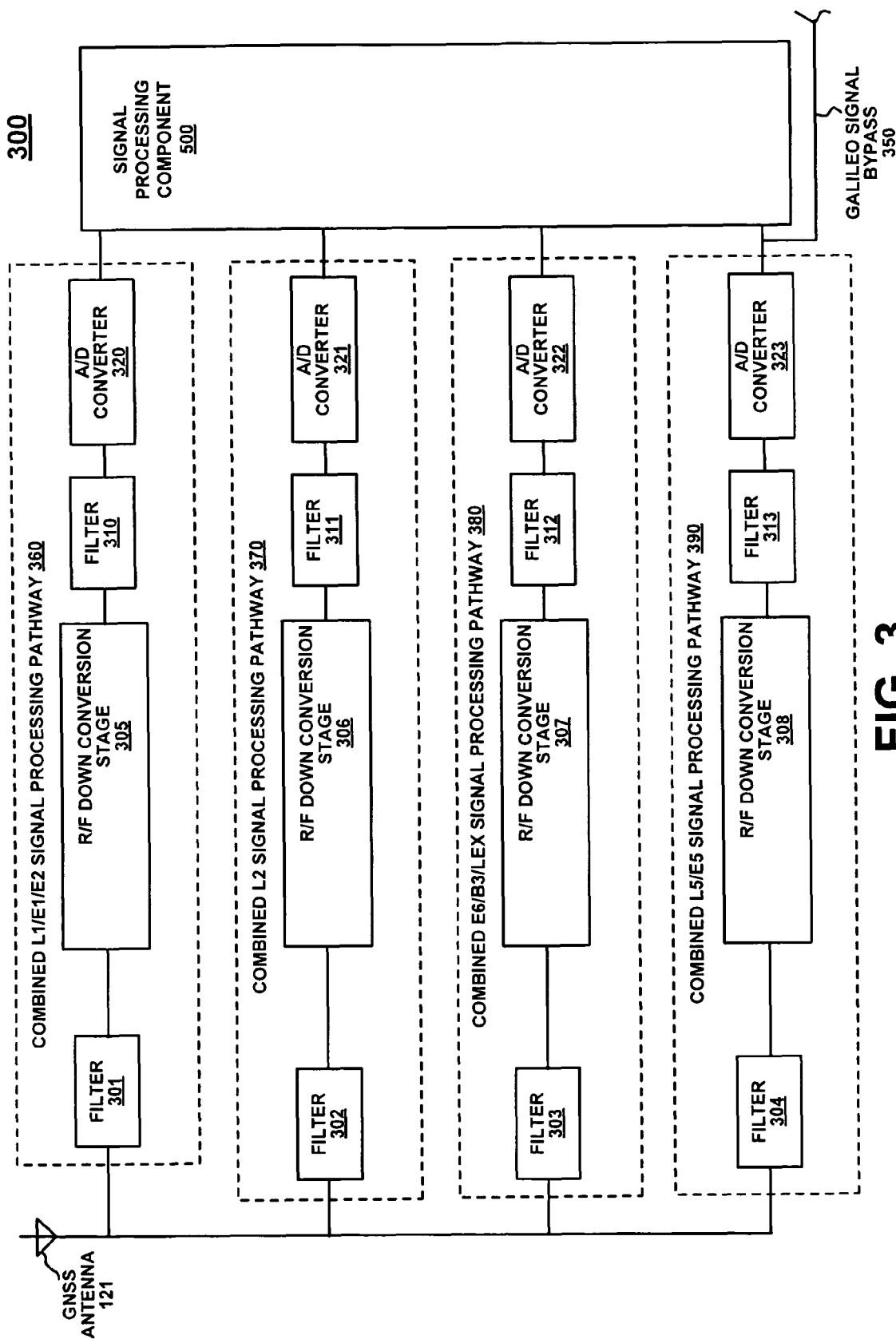
FIG. 3 is a block diagram of an exemplary GNSS receiver in accordance with embodiments of the present invention.

FIG. 3 is a block diagram of an exemplary GNSS receiver 300 in accordance with embodiments of the present invention. It is noted that GNSS receiver 300 may be implemented as GNSS receiver 122 of FIG. 1 or GNSS receiver 222 of FIG. 2. In FIG. 3, a GNSS antenna (e.g., 121 or 221 of FIGS. 1 and 2 respectively) is coupled with a plurality of filters (e.g., 301, 302, 303, and 304). Each of the filters 301, 302, 303, and 304 is then communicatively coupled with a respective radio frequency down conversion stage (e.g., 305, 306, 307, and 308 respectively). It is appreciated that there are a variety of implementations of RF down conversion stages which may be implemented in accordance with embodiments of the present invention.

In the embodiment of FIG. 3, each of the RF down conversion stages (e.g., 305, 306, 307, and 308) is communicatively coupled with a respective filter (e.g., 310, 311, 312, and 313 respectively). In one embodiment, filters 310, 311, 312, and 313 are then communicatively coupled with analog to digital converters (e.g., A/D 320, 321, 322, and 323 respectively).

However, it is noted that in embodiments of the present invention, A/D converters 320, 321, 322, and 323 may not comprise components RF down conversion stages 305, 306, 307, and 308. In other words, analog to digital conversion may be performed by a component other than RF down conversion stages 305, 306, 307, and 308. In FIG. 3, each of the A/D converters is then communicatively coupled with a signal processing component 500 which comprises a signal decimator (e.g., 510 of FIG. 5).

In embodiments of the present invention, filter 301, RF down conversion stage 305, filter 310, and A/D converter 320 comprises a combined L1/E1/E2 signal processing pathway 360 for combining a plurality of received L1/E1/E2 satellite navigation signals as a combined signal set. For example, embodiments of the present invention combine a plurality of L1/E1/E2 satellite navigation signals which are selected from, but are not limited to, the Glonass system, GPS, the Wide Area Augmentation System (WAAS), the European Geostationary Navigation Overlay Service (EGNOS), the Quasi-zenith Satellite System (QZSS), the Compass navigation system (also referred to as the Beidou-2 navigation system), and the Indian Regional Navigational Satellite System (IRNSS), as well as a received Galileo E1 signal. In one embodiment, filter 301 is selected to pass a greater bandwidth such that received GPS, WAAS, EGNOS, and QZSS L1 satellite navigation signals, received Galileo E1 signals, received GLONASS L1 signals, and received Compass system E1 and E2 signals can be input to RF down conversion stage 305. It is noted that the above listed satellite navigation signals are not intended to limit embodiments of the present invention to those satellite navigation systems or signals alone.

Similarly, filter 302, RF down conversion stage 306, filter 311, and A/D converter 321 comprises a combined L2 signal processing pathway 370 for combining a plurality of received satellite navigation L2 signals as a combined signal set. For example, embodiments of the present invention combine a plurality of L2 satellite navigation signals which are selected from, but are not limited to, the Glonass system, GPS, and QZSS. Again filter 302 is selected to pass a greater bandwidth such that received GPS and QZSS L2 signals, and received GLONASS L2 signals can be input to RF down conversion stage 306 in one embodiment. It is noted that the above listed satellite navigation signals are not intended to limit embodiments of the present invention to those satellite navigation systems or signals alone.

Additionally, filter 304, RF down conversion stage 308, filter 313, and A/D converter 323 comprises a combined L5/E5 signal processing pathway 390 for combining a plurality of received satellite navigation E5 signals and received satellite navigation L5 signals as a combined signal set. For example, embodiments of the present invention combine a plurality of L5/E5 satellite navigation signals selected from, but not limited to, the Galileo system, QZSS, GPS, WAAS, the Compass navigation system, and IRNSS. Again, filter 304 is selected to pass a greater bandwidth such that received GPS, WAAS, QZSS, IRNSS, Compass system, and Galileo E5 signals, as well as a received Galileo AltBOC signal, can be input to RF down conversion stage 308 in one embodiment. It is noted that the above listed satellite navigation signals are not intended to limit embodiments of the present invention to those satellite navigation systems or signals alone.

In the present embodiment, filter 303, RF down conversion stage 307, filter 312, and A/D converter 322 comprises a combined E6/B3/LEX signal processing pathway 380 for combining a plurality of received satellite navigation E6/B3/

LEX signals as a combined signal set. For example, embodiments of the present invention combine a plurality of E6/B3/LEX satellite navigation signals which are selected from, but are not limited to, the Galileo system, the Compass navigation system, and QZSS. It is again noted that filter 303 is selected to pass a greater bandwidth such that received Galileo E6 signals, QZSS LEX signals, and Compass system B3 signals can be input to RF down conversion stage 307 in one embodiment. It is noted that the above listed satellite navigation signals are not intended to limit embodiments of the present invention to those satellite navigation systems or signals alone. For example, other satellite navigation systems currently may utilize a combination of signals which is not currently implemented in one of the above listed satellite navigation systems. Additionally, some navigation systems may utilize a signal which is adjacent to the frequency band of one of the above listed satellite navigation signals. Embodiments of the present invention are well suited for combining the signals of these adjacent frequencies as well.

In a typical conventional satellite navigation receiver using a plurality of satellite navigation signals, each received signal band is processed by a separate signal processing pathway. For example, a Glonass L1 signal is processed by a first signal processing pathway, while a GPS L1 signal is processed by a separate signal processing pathway. Typically, these signal processing pathways have essentially the same topology and differ in the frequencies of their respective local oscillators and filter center frequencies. Similarly, a Glonass L2 signal is processed on a separate signal processing pathway than a GPS L2 signal. Again, the Glonass L2 signal processing pathway and the GPS L2 signal processing pathways have essentially the same topology as that of the Glonass L1 and GPS L1 signal processing pathways. As a result, a relatively large amount of area is dedicated to the plurality of RF/IF demodulation chains. The plurality of demodulation chains also requires a relatively large amount of power.

Embodiments of the present invention reduce the number of signal processing pathways by combining the L1/E1/E2, the L2, the L5/E5, and the E6/B3/LEX signals of a plurality of satellite navigation systems into respective combined signal processing pathways. This is possible because of the proximity of these signals in the frequency spectrum. For example, with reference to Table 1 below, the Glonass L1, Galileo E1, WAAS L1, EGNOS L1, QZSS L1, Compass E1 and E2, and GPS L1 signals are relatively close to each other in the frequency spectrum. Similarly, the Glonass L2, QZSS L2, and GPS L2 signals are relatively close to each other in the frequency spectrum. Similarly, the GPS L5, WAAS L5, QZSS L5, Compass L5, and Galileo E5 signals are relatively close to each other in the frequency spectrum. Similarly, the Galileo E6, Compass B3, and QZSS LEX signals are relatively close to each other in the frequency spectrum. Excluding Galileo E5-AltBOC, the frequency band allotted to each of these signals has a bandwidth of approximately 25 MHz or less which will encompass the majority of the transmitted signal. In embodiments of the present invention, the combined signal pathways (e.g., 305, 306, 307, and 308) output a combined signal set which has a bandwidth of approximately 50 MHz. However, it is noted that the bandwidth of the combined signal set may be other than 50 MHz depending upon which signals are combined. Typically, this would have no advantage over conventional GNSS processing systems with regard to power consumption as power consumption in a digital ASIC is approximately proportional to the clock rate. Thus, an ASIC operating at a 50 MHz sampling rate would consume twice the power of an ASIC operating at a 25 MHz sampling rate. However, by utilizing the signal decimator functionality of signal processing component 500, embodiments of the present invention permit the output of 25 MHz sample streams for their respective signals. For example, while signal processing component 500 receives a 50 MHz L1/E1 signal from RF down conversion stage 305, it outputs two 25 MHz signal streams, a 25 MHz Glonass L1 signal and any of a 25 MHz GPS/WAAS/EGNOS/QZSS L1 signal, or 25 MHz Galileo E1 signal. It is noted that to include the Compass E1/E2 signals, a slightly faster sampling rate is used in one embodiment of the present invention. For example, in one embodiment the bandwidth of the combined E1/E2 signal set from combined L1/E1/E2 signal processing pathway 360 is approximately 60 MHz and signal processing component 500 outputs two 30 MHz, or lower, signal streams (e.g., a 30 MHz E1 signal stream and a 30 MHz E2 signal stream).

TABLE 1

| System | Band | Frequency |
| --- | --- | --- |
| GPS/SBAS (WAAS/EGNOS/MSAS)/QZSS | L1 | 1575.42 MHz |
| GPS/QZSS | L2 | 1227.6 MHz |
| GPS/SBAS (WAAS)/QZSS | L5 | 1176.45 MHz |
| GLONASS | L1 | 1602 + N × 0.5625 MHz (N = −7 thru 13) |
| GLONASS | L2 | 1246 + N × 0.4375 MHz (N = −7 thru 13) |
| Galileo | E5A | 1176.45 MHz |
| Galileo/Compass | E5B | 1207.14 MHz |
| Galileo | E5A + E5B (AltBOC) | 1191.795 MHz |
| Galileo | E6 | 1278.75 MHz |
| Compass | E2 | 1561.098 MHz |
| Compass | E1 | 1589.74 MHz |
| Compass | B3 | 1268.53 MHz |
| QZSS | LEX | 1278.75 MHz |
| IRNSS | E5/AltBOC | 1176.45 MHz |
| GAGAN | L1 | 1575.42 MHz |
| GAGAN | L5 | 1176.45 MHz |
| GLONASS | L3 | 1201 + N × TBD MHz (N = −7 thru 13) |
| Galileo | E1 | 1575.42 MHz |

Sources:
IS-GPS-200 Revision D
GLONASS Interface Control Document, version 5.0, 2002
IS-QZSS, Ver. 0.1, Jun. 8, 2007
RTCA DO-229D (SBAS)
Envisioning a Future GNSS System of Systems, InsideGNSS, Vol. 2, No. 1

Similarly, signal processing component 500 receives a 50 MHz L2 signal from RF down conversion stage 306, it outputs two 25 MHz signal streams, a 25 MHz Glonass L2 signal and any of a 25 MHz GPS/QZSS L2 signal. In the embodiment of FIG. 3, signal processing component 500 receives a 50 MHz L5/E5 signal from down conversion stage 308 and outputs any of a 25 MHz Galileo or Compass E5B signal and any of a 25 MHz GPS/WAAS/QZSS L5 signal, a 25 MHz IRNSS E5 signal, or a 25 MHz Galileo E5A signal. These 25 MHz samples output from signal processing component 500 can subsequently be processed in a channel with a 25 MHz clock and hence have almost the same power consumption as typical conventional GNSS receivers.

In one embodiment, rather than communicatively coupling Galileo signals E5A and E5B through signal processing component 500, a Galileo signal bypass 350 bypasses signal processing component 500 and instead sends the E5 signals to the signal ASIC (not shown) for further processing. This allows sending the entire Galileo E5 signal at 50 MHz which may be optimal for processing the Galileo AltBOC data in some instances. It is noted that in one embodiment, the Galileo E5 signal may be selectively sent to Galileo signal bypass 350. In other words, the Galileo E5 signal may be sent to signal processing component 500 or to Galileo signal bypass 350 depending upon configuration or selected parameters for the GNSS receiver. In one embodiment, Galileo signal bypass 350 may be implemented by signal processing component 500.

In another embodiment in accordance with the present invention, a lower decimation rate can be used to process GPS signals. For example, in one embodiment, the GPS L1 signal can be decimated to a 2 MHz signal. This would provide further power savings and permit minimal baseband power increase. This is important for "low-end" products which may not necessarily have the available baseband power available. It is noted that this method is not limited to GPS L1 signals alone in embodiments of the present invention.

As a result, embodiments of the present invention reduce the board space required for GNSS RF/IF sections without significantly increasing power consumption. For example, in the embodiment of FIG. 3, a reduction in board space of 40% is realized in the L1/E1, L2, and L5/E5 circuitry in systems operable for utilizing GPS, Glonass, and Galileo satellite navigation systems. Additionally, a simplification of the design and fabrication of the GNSS receiver circuitry is realized. Finally, the reduction in size of the GNSS receiver circuitry facilitates incorporating GNSS functionality in smaller packages and is therefore well suited for the increasingly smaller mobile electronic devices being produced. It is noted that embodiments of the present invention are not intended to be limited to the specific frequencies and bandwidths described above. That is, other embodiments of the present invention may utilize other signal frequencies, sampling frequencies, and/or decimation frequencies than those cited in the example of FIG. 3.

Figure 4:
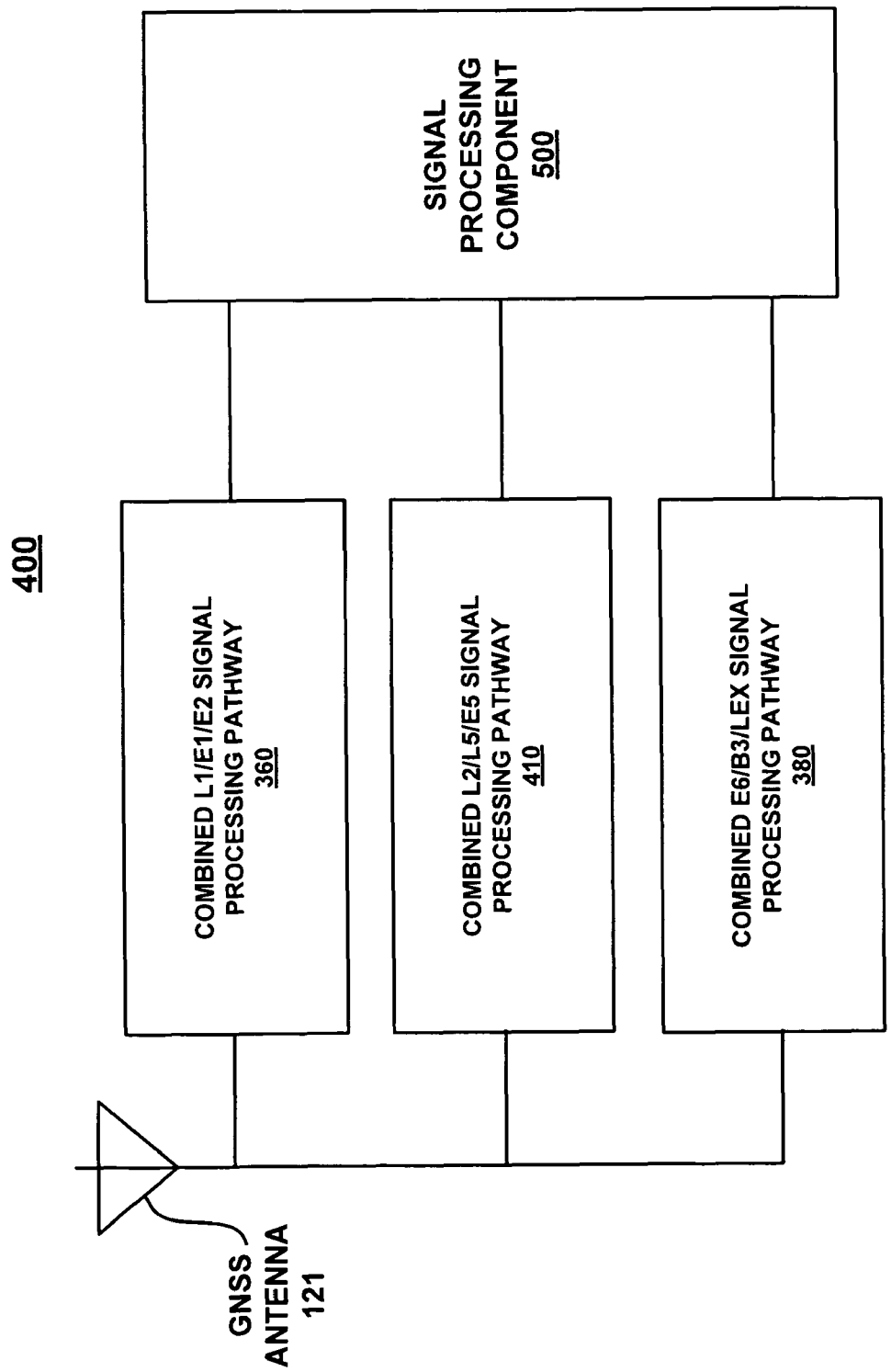
FIG. 4 is a block diagram of an exemplary GNSS receiver in accordance with another embodiment of the present invention.

FIG. 4 is a block diagram of an exemplary GNSS receiver 400 in accordance with another embodiment of the present invention. In the embodiment of FIG. 4, GNSS receiver 400 comprises a combined L1/E1/E2 signal processing pathway 360 which is communicatively coupled with GNSS antenna 121. GNSS receiver 400 further comprises a combined E6/B3/LEX signal processing pathway 380. The filters (e.g., 301, and 303), RF down conversion stages (e.g., 305 and 307), filters (e.g., 310 and 312), and A/D converters (e.g., 320 and 322) of GNSS receiver 400 are similar in form and function to that of GNSS receiver 300 described above and are not described again for purposes of brevity and clarity.

In the embodiment of FIG. 4, GNSS receiver 400 further comprises a combined L2/L5/E5 signal processing pathway 410. In one embodiment of the present invention, the combined L2 signal processing pathway 370 and the combined L5/E5 signal processing pathway 390 of FIG. 3 are combined due to the proximity in the frequency spectrum of the signals which they process. Thus, in one embodiment, combined L2/L5/E5 signal processing pathway 410 outputs a 100 MHz signal to signal processing component 500 which then outputs a 25 MHz Glonass L2 signal and a 25 MHz GPS/QZSS L2 signal and any of a 25 MHz Galileo or Compass E5B signal and any of a 25 MHz GPS/WAAS/QZSS L5 signal, a 25 MHz IRNSS E5 signal, a 25 MHz Galileo E5A signal, or a 50 MHz Galileo AltBOC signal. Thus, by sampling the signal output from combined L2/L5/E5 signal processing pathway 410 at a higher rate (e.g., at approximately 100 MHz), embodiments of the present invention facilitate a further reduction of the board space required for GNSS RF/IF sections without significantly increasing power consumption. It is noted that the present invention is not limited to combining the L2/L5/E5 signals in a combined signal processing pathway. In other words, signals listed above in Table 1, as well as other satellite downlinks such as the OmniSTAR® downlink or others, may be combined in a combined signal processing pathway in embodiments of the present invention. For example, the OmniSTAR® downlink utilizes a signal at a frequency just below the GPS L1 signal frequency. Thus, in one embodiment, combined L1/E1/E2 signal processing pathway 360 can be configured to also include the OmniSTAR® downlink in one embodiment.

Figure 5:
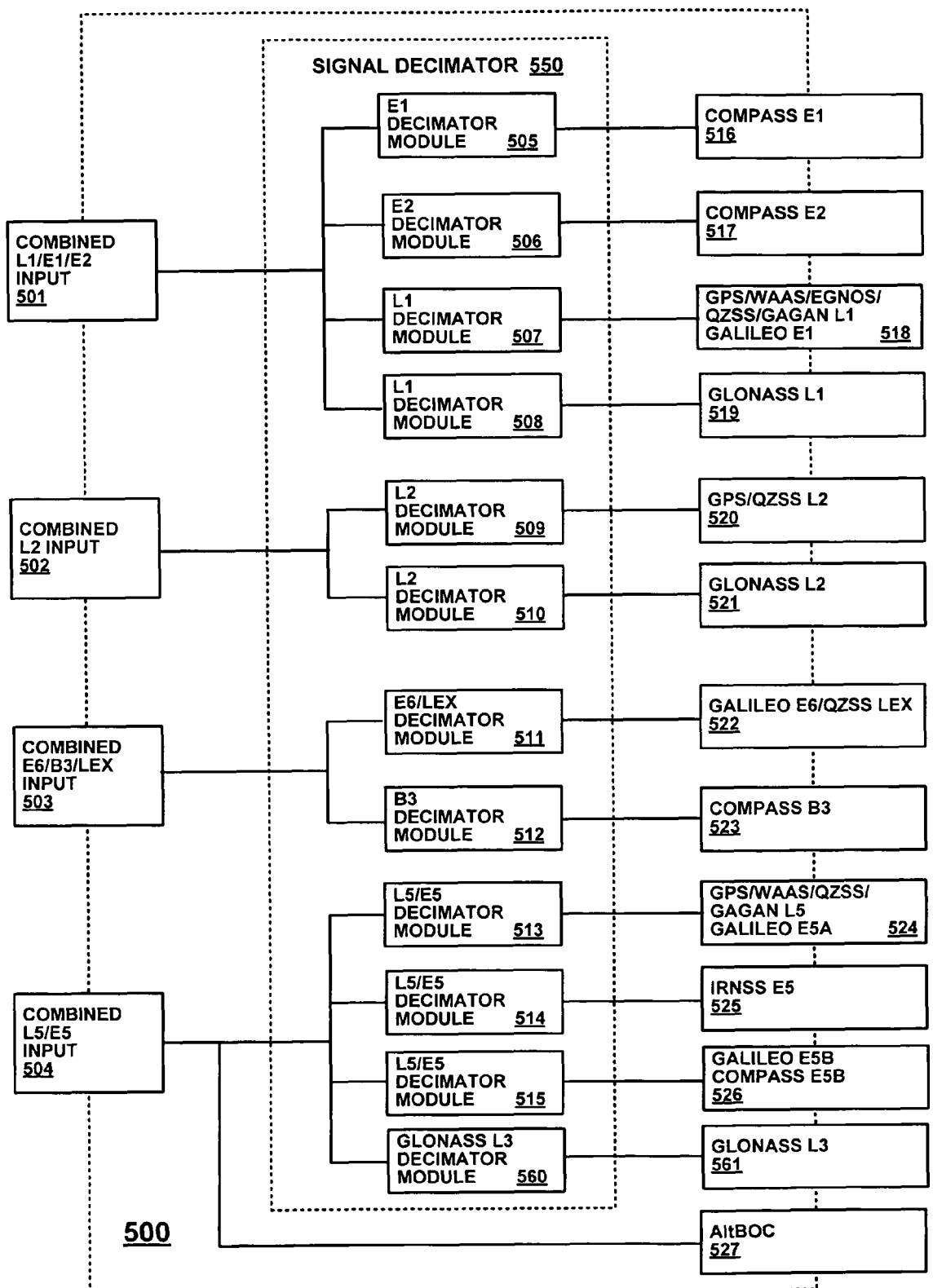
FIG. 5 is a block diagram of an exemplary GNSS signal processing component in accordance with embodiments of the present invention.

FIG. 5 is a block diagram of an exemplary signal processing component 500 in accordance with embodiments of the present invention. In FIG. 5, signal processing component 500 comprises a combined L1/E1/E2 signal processing pathway input (e.g., Combined L1/E1/E2 input 501) to which combined L1/E1/E2 signal processing pathway 360 is communicatively coupled. Signal processing component 500 further comprises an L2 signal processing pathway input (e.g., Combined L2 input 502) to which combined L2 signal processing pathway 370 is communicatively coupled. Signal processing component 500 further comprises a combined E6/B3/LEX signal processing pathway input 503 to which combined E6/B3/LEX signal processing pathway 380 is communicatively coupled. Signal processing component 500 further comprises a combined L5/E5 signal processing pathway input (e.g., Combined L5/E5 input 504) to which combined L5/E5 signal processing pathway 390 is communicatively coupled. In embodiments of the present invention, combined L1/E1/E2 input 501, combined L2 input 502, combined E6/B3/LEX input 503, and combined L5/E5 input 504 are selectively coupled with signal decimator 550.

In the embodiment of FIG. 5, combined L1/E2 input 501 is communicatively coupled with E1 decimator module 505, E2 decimator module 506, L1 decimator module 507, and L1 decimator module 508. Furthermore, E1 decimator module 505 is communicatively coupled with Compass E1 output 516. E2 decimator module 506 is communicatively coupled with Compass E2 module 517. L1 decimator module 507 is communicatively coupled with GPS/WAAS/EGNOS/QZSS/GAGAN L1/Galileo E1 output 518. L1 decimator module 508 is communicatively coupled with Glonass L1 output 519.

In one embodiment of the present invention, the 50 MHz signal input from combined L1 input 501 is separated into various frequency components which are then separately processed by E1 decimator module 505, E2 decimator module 506, L1 decimator module 507, and L1 decimator module 508 of signal decimator 550. In one embodiment, the 30 MHz E1 signal output by E1 decimator module 505 is sent to Compass E1 output 516. Similarly, the 30 MHz E2 signal output by E2 decimator module 506 is sent to Compass E2 output 517. The 25 MHz GPS/WAAS/EGNOS/QZSS L1 signal output by decimator module 507 is sent to GPS/WAAS/EGNOS/QZSS/GAGAN L1 output 518 and the 25 MHz Glonass L1 signal output by L1 decimator module 508 is sent to Glonass L1 output 519.

In the embodiment of FIG. 5, combined L2 input 502 is communicatively coupled with L2 decimator module 509 and L2 decimator module 510. L2 decimator module 509 is communicatively coupled with GPS/QZSS L2 output 520 while L2 decimator module 510 is communicatively coupled with Glonass output 521.

In one embodiment, the 50 MHz signal input from combined L2 input 502 is separated into various frequency components which are then separately processed by L2 decimator modules 509 and 510 of signal decimator 550. The 25 MHz GPS/QZSS L2 signal output by decimator module 509 is sent to GPS/QZSS L2 output 520 while the 25 MHz Glonass L2 signal output by decimator module 510 is sent to Glonass L2 output 521.

In the embodiment of FIG. 5, combined E6/B3/LEX input 503 is communicatively coupled with E6/LEX decimator module 511 and with B3 decimator module 512. E6/LEX decimator module 511 is communicatively coupled with Galileo E6/QZSS LEX output 522 while B3 decimator module 512 is communicatively coupled with Compass B3 output 523.

In one embodiment, the 50 MHz signal input from combined E6/B3/LEX input 503 is separated into various frequency components which are then separately processed by E6/LEX decimator module 511 and B3 decimator module 512 of signal decimator 550. E6/LEX decimator module 511 outputs a 25 MHz Galileo E6/QZSS LEX signal to Galileo E6/QZSS LEX output 522. B3 decimator module 512 outputs a 25 MHz Compass B3 signal to Compass B3 signal output 523.

In the embodiment of FIG. 5, combined L5/E5 input 504 is communicatively coupled with L5/E5 decimator module 513, L5/E5 decimator module 514, L5/E5 decimator module 515, and GLONASS L3 decimator module 560. L5/E5 decimator module 513 is communicatively coupled with GPS/WAAS/QZSS/GAGAN L5/Galileo E5A output 524. L5/E5 decimator module 514 is communicatively coupled with IRNSS E5 output 525. L5/E5 decimator module 515 is communicatively coupled with Galileo E5B/Compass E5B output 526. GLONASS L3 decimator module 560 is communicatively coupled with GLONASS L3 output 561.

In one embodiment, the 50 MHz signal input from combined L5/E5 input 504 is separated into various frequency components which are processed by L5/E5 decimator modules 513 and 515 of signal decimator 550. The 25 MHz Galileo E5A signal output by decimator module 513 is sent to output 524 while the 25 MHz Galileo E5B signal output by decimator module 515 is sent to Galileo E5B/Compass E5 output 526. In another embodiment, the 50 MHz signal from combined L5/E5 input 504 is separated into a 25 MHz GPS/WAAS/QZSS/GAGAN L5 signal using decimator module 513 which is then sent to output 524. In another embodiment, an IRNSS E5 signal from L5/E5 input 504 is separated using decimator module 514 and a 25 MHz signal is output which is sent to IRNSS E5 output 525. In another embodiment, a GLONASS L3 signal from L5/E5 input 504 is separated using decimator module 560 and a 25 MHz GLONASS signal is output which is sent to GLONASS L3 output 561.

It is noted that in one embodiment, combined L5/E5 input 504 is also communicatively coupled with AltBOC outlet 527. In one embodiment, when processing the Galileo AltBOC signal, the entire 50 MHz sample stream is passed from combined L5/E5 signal processing pathway 390 and selectively passed to AltBOC output 527 without being separated into 25 MHz signals by L5/E5 decimator module 515. The 50 MHz signal from combined L5/E5 signal processing pathway 390 can then be processed with a 50 MHz clock.

Figure 6:
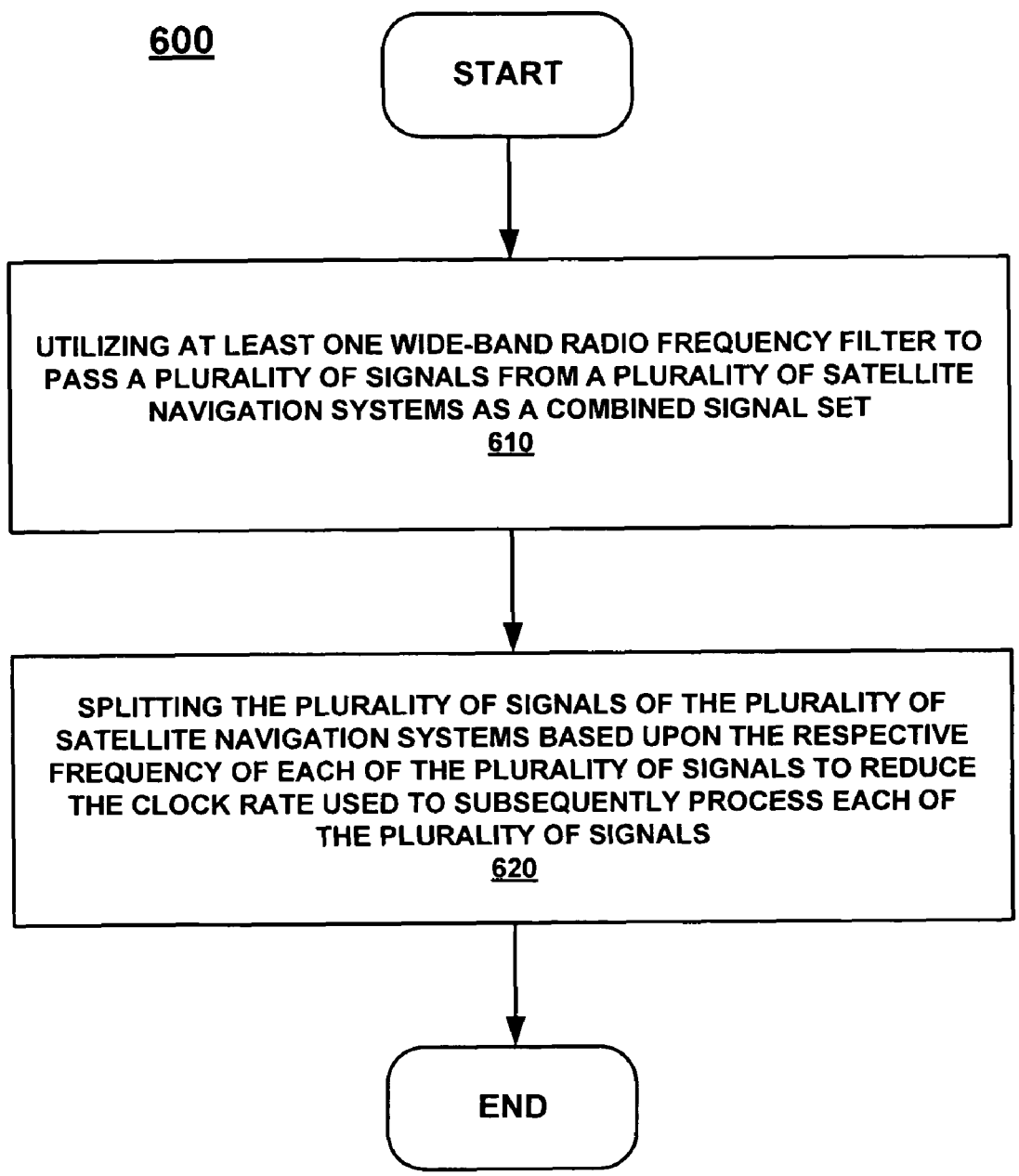
FIG. 6 is a flowchart of a method for processing Global Navigation Satellite System (GNSS) signals in accordance with embodiments of the present invention.

FIG. 6 is a flowchart of a method for processing Global Navigation Satellite System (GNSS) signals in accordance with embodiments of the present invention. In step 610 of FIG. 6, at least one wide-band Radio Frequency (R/F) filter is utilized to pass a plurality of signals from a plurality of satellite navigation systems as a combined signal set. As discussed above with reference to FIG. 3, combined L1/E1/E2 signal processing pathway 360 combines a plurality of signals from a plurality of satellite navigation systems. In embodiments of the present invention, filter 301 comprises a wide-band filter which passes the L1/E1/E2 signals from a plurality of satellite navigation systems onto a single signal processing pathway. Similarly, filters 302, 303, and 304 pass a plurality of signals from a plurality of satellite navigation systems onto respective combined signal processing pathways. In so doing, embodiments of the present invention reduce the board space required for GNSS RF/IF sections without significantly increasing power consumption. Additionally, a simplification of the design and fabrication of the GNSS receiver circuitry is realized in embodiments of the present invention. Finally, the reduction in size of the GNSS receiver circuitry in embodiments of the present invention facilitates incorporating GNSS functionality in smaller packages and is therefore well suited for the increasingly smaller mobile electronic devices being produced.

In step 620 of FIG. 6, the plurality of signals of the plurality of satellite navigation systems is split based upon the respective frequency of each of the plurality of signals to reduce the clock rate used to subsequently process each of the plurality of signals. In one embodiment, signal processing component 500 utilizes signal decimator 550 to separate the plurality of signals which are combined in a particular combined signal processing pathway. In so doing, the clock rate used for processing the separated signals can be reduced which reduces the power consumption for the GNSS receiver in accordance with embodiments of the present invention.

Figure 7:
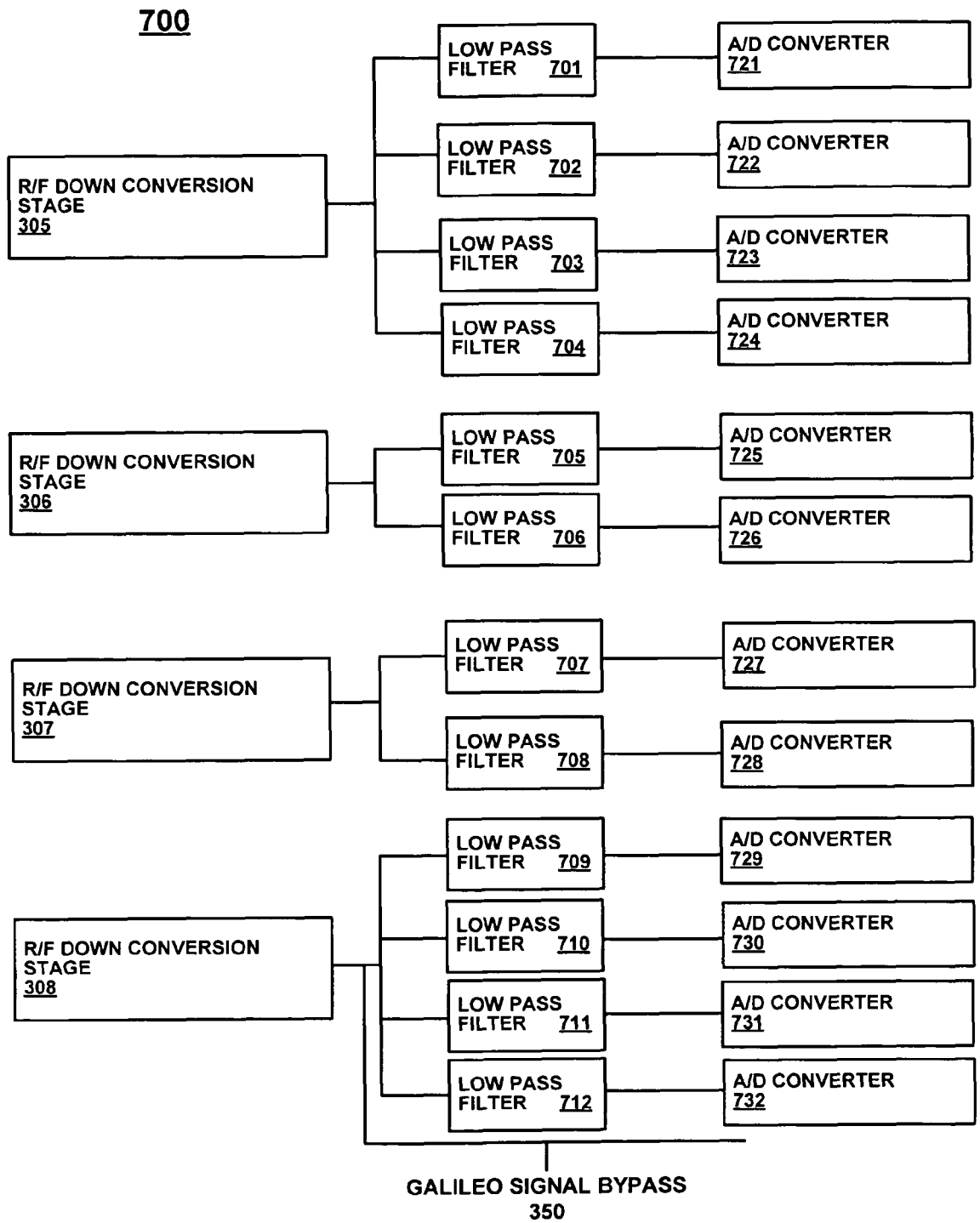
FIG. 7 is a block diagram of an exemplary GNSS receiver in accordance with another embodiment of the present invention.

FIG. 7 is a block diagram of an exemplary GNSS receiver 700 in accordance with another embodiment of the present invention. In FIG. 7, GNSS receiver 700 comprises R/F down conversion stages 305, 306, 307, and 308. It is noted that R/F down conversion stages 305, 306, 307, and 308 are similar in form and function to those described above with reference to GNSS receiver 300 of FIG. 3 and are not described again for purposes of brevity and clarity. Furthermore, GNSS antenna 121, and filters 301, 302, 303, and 304 have been omitted for the purposes of brevity and clarity.

In FIG. 7, R/F down conversion stage 305 is communicatively coupled with a plurality of filters (e.g., 701, 702, 703, and 704). Furthermore, each of the filters is communicatively coupled with a respective A/D converter (e.g., 721, 722, 723, and 724 respectively). In one embodiment, each of the filters coupled with R/F down conversion stage 305 is selected to pass the signal of a particular frequency band. For example, in one embodiment filter 701 is selected to pass the Compass E1 signal. Similarly, filters 702, 703, and 704 are selected to pass the Compass E2, GPS/WAAS/EGNOS/QZSS/GAGAN L1/Galileo E1, and Glonass L1 signals respectively. In one embodiment, these signals are passed to their respective A/D converters (e.g., 721, 722, 723, and 724) which then pass their respective digital signals to a GNSS processing component (not shown). As a result, a higher sampling rate of the signal (s) from R/F down conversion stage 305 is not utilized with GNSS receiver 700. Furthermore, a signal decimator (e.g., 550 of FIG. 5) is not necessary with GNSS receiver 700.

In a similar manner, R/F down conversion stage 306 is communicatively coupled with a plurality of filters (e.g., 705 and 706). Furthermore, each of the filters is communicatively coupled with a respective A/D converter (e.g., 725 and 726 respectively). As discussed above, each of the filters coupled with R/F down conversion stage 306 is selected to pass the signal of a particular frequency band. For example, in one embodiment filter 705 is selected to pass the GPS/QZSS L2 signal while filter 706 is selected to pass the Glonass L2 signal. In one embodiment, these signals are passed to their respective A/D converters (e.g., 725 and 726) which then pass their respective digital signals to a GNSS processing component (not shown).

Similarly, R/F down conversion stage 307 is communicatively coupled with a plurality of filters (e.g., 707 and 708). Furthermore, each of the filters is communicatively coupled with a respective A/D converter (e.g., 727 and 728 respectively). As discussed above, each of the filters coupled with R/F down conversion stage 307 is selected to pass the signal of a particular frequency band. For example, in one embodiment filter 707 is selected to pass the Galileo E6/QZSS LEX signal while filter 708 is selected to pass the Compass B3 signal. In one embodiment, these signals are passed to their respective A/D converters (e.g., 727 and 728) which then pass their respective digital signals to a GNSS processing component (not shown).

Finally, R/F down conversion stage 308 is communicatively coupled with a plurality of filters (e.g., 709 and 710, 711, and 712). Furthermore, each of the filters is communicatively coupled with a respective A/D converter (e.g., 729, 730, 731, and 732 respectively). As discussed above, each of the filters coupled with R/F down conversion stage 308 is selected to pass the signal of a particular frequency band. For example, in one embodiment filter 709 is selected to pass the GPS/WAAS/QZSS/GAGAN L5/Galileo E5A signal, filter 710 is selected to pass the IRNSS E5 signal, filter 711 is selected to pass the Galileo E5B/Compass E5B signal, and filter 712 is selected to pass the GLONASS L3 signal. In one embodiment, these signals are passed to their respective A/D converters (e.g., 729, 730, 731, and 732) which then pass their respective digital signals to a GNSS processing component (not shown).

As discussed above, by combining the signals of a plurality of satellite navigation signals onto respective wide band RF filters, embodiments of the present invention reduce the board space required for GNSS RF/IF sections without significantly increasing power consumption. Additionally, a simplification of the design and fabrication of the GNSS receiver circuitry is realized. Finally, the reduction in size of the GNSS receiver circuitry facilitates incorporating GNSS functionality in smaller packages and is therefore well suited for the increasingly smaller mobile electronic devices being produced.

Figure 8:
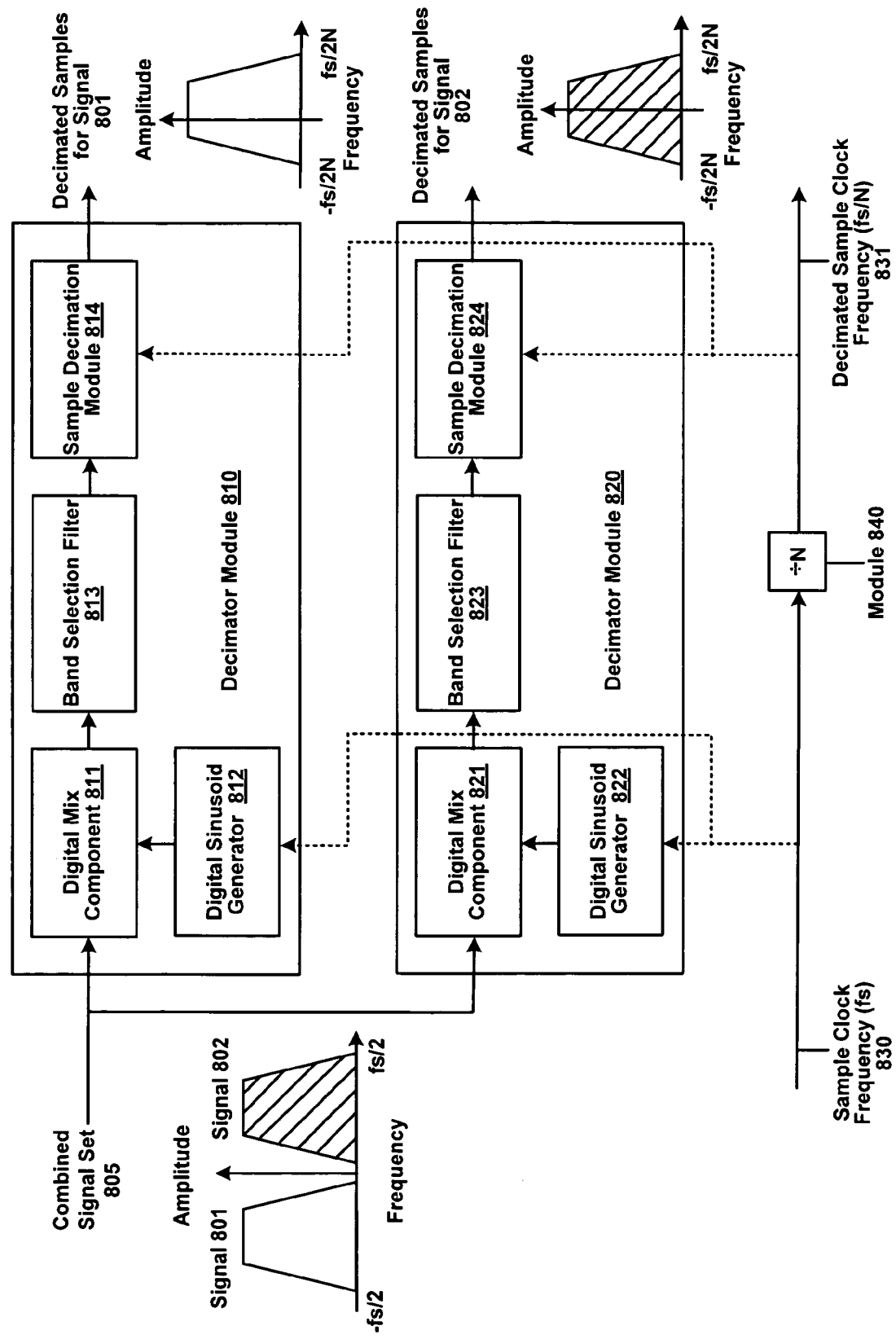
FIG. 8 shows exemplary decimator modules in accordance with one embodiment of the present invention.

FIG. 8 shows exemplary decimator modules in accordance with one embodiment of the present invention. In FIG. 8, a plurality of distinct signals (e.g., signal 801 and signal 802) are received as a combined signal set 805. It is noted that for clarity, combined signal set 805 only comprises two signals in the example of FIG. 8.

Combined signal set 805 is received at each of decimator module 810 and decimator module 820. In decimator module 810, combined signal set 805 is first processed by digital mix component 811 which moves the signal band of interest to a different center frequency for further processing. For example, decimator module 810 processes signal 801 and the mix frequency of digital mix component 811 is centered upon the frequency range of signal 801. Similarly, the mix frequency of digital mix component 821 is centered on the frequency range of signal 802. In one embodiment, digital mix components 811 and 821 are optional. For example, if the center frequency of combined signal set 805 is already at a desired frequency, the digital mix stage can be bypassed. In one embodiment, the center frequency of combined signal set 805 may already be at the desired frequency due to the architecture of the RF conversion stage (e.g., 305, 306, 307 and/or 308 of FIG. 3) which is processing combined signal set 805. It is noted that digital mix components 811 and 821 can be implemented as real or complex mix stages based upon the sampling technique used to process combined signal set 805.

In FIG. 8, digital mix component 811 and digital mix component 821 are coupled with digital sinusoid generators 812 and 822 respectively. In one embodiment, digital sinusoid generators 812 and 822 are implemented as look-up tables for generating sine/cosine phases which are used by digital mix components 811 and 821.

In FIG. 8, band selection filters 813 and 823 are respectively coupled with digital mix components 811 and 821. Band selection filters 813 and 823 are for defining the frequency range of the desired output signal. In one embodiment, band selection filters 813 and 823 may be implemented as simple filters for averaging multiple samples of their respective distinct signals. Thus, band selection filters 813 and 823 can perform filtering and decimation of signals 801 and 802 respectively in a single processing step. In another embodiment, more complex filters are used as band selection filters 813 and 823 to perform multiplication by filter coefficients to give a higher sample resolution. The more complex filters could also potentially resample their respective signals to reduce the resolution prior to further processing. In another embodiment, band selection filters 813 and 823 are lowpass filters, using re-thresholding of samples, to select one signal and reject the other. It is again noted that, depending upon the architecture of the RF conversion stage (e.g., 305, 306, 307 and/or 308 of FIG. 3) which is processing combined signal set 805, filtering of a given signal by a band selection filter may not be necessary in embodiments of the present invention. Furthermore, band selection filters 813 and 823 can be used for real or complex processing of their respective signals in embodiments of the present invention.

FIG. 8 also shows sample decimation modules 814 and 824 respectively coupled with band selection filters 813 and 823. In one embodiment, sample decimation modules 814 and 824 are for reducing the sample rate of signals 801 and 802 respectively. In one embodiment, sample decimation modules 814 and 824 sample the higher rate signal of combined signal set 805 and discards some of the samples to lower the sample rate. Prior processing of combined signal set 805 is performed to minimize signal loss caused by the decimation process. In one embodiment, a sample clock frequency 830, which is based upon the frequency of combined signal set 805, is supplied to digital sinusoid generators 812 and 822. Furthermore, sample clock frequency 830 is divided by a factor of N by module 840 to supply a decimated clock frequency 831 to sample decimation modules 814 and 824. This in turn controls the reduction of the signal frequency of signals 801 and 802 such that the frequencies of the decimated samples for signal 801 and the decimated samples for signal 802 have been reduced by a similar magnitude.

It is noted that FIG. 8 shows two decimation modules for purposes of brevity. In other words, signal decimator module 550 of FIG. 5 may comprise a plurality of decimator modules similar to decimator modules 810 and 820 described above if combined signal set 805 comprises more than two signals.

Embodiments of the present invention, sample decimation in a GNSS receiver, are thus described. While the present invention has been described in particular embodiments, it should be appreciated that the present invention should not be construed as limited by such embodiments, but rather construed according to the below claims.

What is claimed is:

1. A method for processing Global Navigation Satellite System (GNSS) signals, said method comprising:

utilizing at least one wide-band Radio Frequency (R/F) filter of a signal processing pathway to pass a plurality of signals from a plurality of satellite navigation systems as a combined signal set, wherein said combined signal set comprises said plurality of satellite navigation signals selected from the group consisting of L1 signals, E1 signals, E2 signals, L2 signals, L3 signals, E6 signals, B3 signals, LEX signals, L5 signals, E5 signals, and AltBOC signals; and splitting said plurality of signals of said plurality of satellite navigation systems based upon the respective frequency of each of said plurality of signals to facilitate reducing the clock rate used to subsequently process each of said plurality of signals.

2. The method as recited in claim 1 further comprising:
combining a plurality of signals selected from the group consisting of: a Glonass L1 signal, a Compass E1 signal, a Compass E2 signal, a Galileo E1 signal, a Global Positioning System (GPS) L1 signal, a Wide Area Augmentation System (WAAS) L1 signal, a European Geostationary Navigation Overlay Service (EGNOS) L1 signal, a MTSAT Satellite-based Augmentation System signal, a GAGAN L1 signal, an OmniSTAR® signal, and a Quasi-zenith Satellite System (QZSS) L1 signal in said combined signal processing pathway.

3. The method as recited in claim 1 further comprising:
combining a plurality of signals selected from the group consisting of: a Glonass L2 signal, a QZSS L2 signal, and a GPS L2 signal in said combined signal processing pathway.

4. The method as recited in claim 1 further comprising:
combining a plurality of signals selected from the group consisting of: a Compass B3 signal, a Galileo E6 signal, and a QZSS LEX signal in said combined signal processing pathway.

5. The method as recited in claim 1 further comprising:
combining a plurality of signals selected from the group consisting of: an IRNSS E5 signal, a GPS L5 signal, a WAAS L5 signal, a QZSS L5 signal, a Galileo E5B signal, a Galileo E5A signal, a Galileo AltBOC signal, a GAGAN L5 signal, a Glonass L3 signal, and a Compass E5B signal in said combined signal processing pathway.

6. The method as recited in claim 1 wherein said splitting further comprises:
using an analog-to-digital converter to convert said combined signal set to a digital combined signal set comprising a plurality of digital signals corresponding to said plurality of signals;
utilizing at least one filter to separate at least one digital signal from said digital combined signal set; and
using a signal decimator to reduce the clock rate used in subsequently processing said at least one digital signal in response to said separating.

7. The method as recited in claim 6 further comprising:
utilizing a Galileo AltBOC signal bypass to prevent said using said signal decimator to process said Galileo AltBOC signal.

8. The method as recited in claim 1 wherein said splitting further comprises:
utilizing at least one filter to separate each of said plurality of signals from said combined signal set; and
converting each of said plurality of signals to a digital signal.

9. A Global Navigation Satellite System (GNSS) receiver comprising:
at least one signal processing pathway comprising:
a wide-band Radio Frequency (R/F) filter to pass a plurality of signals from a plurality of satellite navigation systems; and
a radio frequency (R/F) down conversion stage configured for combining said plurality of signals from said plurality of satellite navigation systems into a combined signal set, wherein said combined signal set comprises said plurality of satellite navigation signals selected from the group consisting of L1 signals, E1 signals, E2 signals, L2 signals, L3 signals, E6 signals, B3 signals, LEX signals, L5 signals, E5 signals, and AltBOC signals.

10. The Global Navigation Satellite System (GNSS) receiver as recited in claim 9 further comprising:
an L1/E1/E2 signal processing pathway for combining a plurality of satellite navigation L1/E1/E2 signals selected from the group consisting of: a Glonass L1 signal, a Compass E1 signal, a Compass E2 signal, a Galileo E1 signal, a Global Positioning System (GPS) L1 signal, a Wide Area Augmentation System (WAAS) L1 signal, a European Geostationary Navigation Overlay Service (EGNOS) L1 signal, a MTSAT Satellite-based Augmentation System signal, a GAGAN L1 signal, an OmniSTAR® signal, and a Quasi-zenith Satellite System (QZSS) L1 signal.

11. The Global Navigation Satellite System (GNSS) receiver as recited in claim 9 further comprising:
an L2 signal processing pathway for combining a plurality of satellite navigation L2 signals selected from the group consisting of: a Glonass L2 signal, a QZSS L2 signal, and a GPS L2 signal.

12. The Global Navigation Satellite System (GNSS) receiver as recited in claim 9 further comprising:
an E6/B3/LEX signal processing pathway for combining a plurality of satellite navigation E6/B3/LEX signals selected from the group consisting of: a Compass B3 signal, a Galileo E6 signal, and a QZSS LEX signal.

13. The Global Navigation Satellite System (GNSS) receiver as recited in claim 9 further comprising:
an L5/E5 signal processing pathway for combining a plurality of satellite navigation L5/E5 signals selected from the group consisting of: an IRNSS E5 signal, a GPS L5 signal, a WAAS L5 signal, a QZSS L5 signal, a Galileo E5B signal, a Galileo E5A signal, a Galileo AltBOC signal, a GAGAN L5 signal, a Glonass L3 signal, and a Compass E5B signal.

14. The Global Navigation Satellite System (GNSS) receiver as recited in claim 9 further comprising:
an AltBOC signal bypass communicatively coupled with said L5/E5 signal processing pathway.

15. The Global Navigation Satellite System (GNSS) receiver as recited in claim 9 further comprising:
an analog-to-digital converter to convert said combined signal set to a digital combined signal set comprising a plurality of digital signals corresponding to said plurality of satellite navigation signals;
at least one filter communicative coupled with said analog-to-digital converter to separate at least one digital signal from said digital combined signal set; and
a signal decimator communicatively coupled with said at least one filter to reduce the clock rate used in subsequently processing said at least one digital signal in response to said separating.

16. The Global Navigation Satellite System (GNSS) receiver as recited in claim 9 further comprising:
at least one filter communicatively coupled with said R/F down conversion stage for separating each of said plurality of signals from said combined signal set and wherein the clock rate used to subsequently process each of said plurality of signals is reduced in response to said separating; and at least one analog-to-digital converter respectively coupled with said at least one filter for respectively converting each of said plurality of signals to a digital signal.

17. A signal processing component of a Global Navigation Satellite System (GNSS) receiver, said signal processing component comprising:

at least one combined satellite navigation signal input which is communicatively coupled with a signal processing pathway comprising a wide-band Radio Frequency (R/F) filter to pass a plurality of signals from a plurality of satellite navigation systems as a combined signal set, wherein said at least one combined satellite navigation signal input is selected from the group consisting of: a combined L1/E1/E2 signal input; a combined L2 signal input; a combined E6/B3/LEX signal input; and a combined L5/E5/L3 signal input; and a signal filtering component communicatively coupled with said at least one combined satellite navigation signal input configured for separating each of said plurality of signals from said combined signal set.

18. The signal processing component of claim 17 wherein said signal filtering component further comprises:

a first plurality of signal decimator modules communicatively coupled with said combined L1/E1/E2 signal input;

a second plurality of signal decimator modules communicatively coupled with said combined L2 signal input;

a third plurality of signal decimator modules communicatively coupled with said combined E6/B3/LEX signal input; and a fourth plurality of signal decimator modules communicatively coupled with said combined L5/E5/L3 signal input.

19. The signal processing component of claim 18 further comprising:

a first plurality of signal outputs communicatively coupled with respective signal decimator modules of said first plurality of signal decimator modules, and wherein said first plurality of signal outputs output a respective signal selected from the group consisting of: a Compass E1 signal, a Compass E2 signal, a Glonass L1 signal; a Galileo E1 signal, a Global Positioning System (GPS) L1 signal, a Wide Area Augmentation System (WAAS) L1 signal, a European Geostationary Navigation Overlay Service (EGNOS) L1 signal, a MTSAT Satellite-based Augmentation System signal, a GAGAN L1 signal, an OmniSTAR® signal, and a Quasi-zenith Satellite System (QZSS) L1 signal;

a second plurality of signal outputs communicatively coupled with respective signal decimator modules of said second plurality of signal decimator modules, and wherein said second plurality of signal outputs output a respective signal selected from the group consisting of: a Glonass L2 signal, a QZSS L2 signal, and a GPS L2 signal;

a third plurality of signal outputs communicatively coupled with respective signal decimator modules of said third plurality of signal decimator modules, and wherein said third plurality of signal outputs output a respective signal selected from the group consisting of: a Compass B3 signal a Galileo E6 signal and a QZSS LEX signal; and a fourth plurality of signal outputs communicatively coupled with respective signal decimator modules of said fourth plurality of signal decimator modules, and wherein said fourth plurality of signal outputs output a respective signal selected from the group consisting of: an IRNSS E5 signal, a GPS L5 signal, a WAAS L5 signal, a QZSS L5 signal, a Galileo E5B signal, a Galileo E5A signal, a Galileo AltBOC signal, a GAGAN L5 signal, a Glonass L3 signal, and a Compass E5B signal.

20. The signal processing component of claim 18 further comprising:

an AltBOC signal output communicatively coupled with said combined L5/E5 signal input and which bypasses said fourth plurality of signal decimator modules.

21. The signal processing component of claim 17 wherein said signal filtering component further comprises:

a signal decimator which is communicatively coupled with said at least one combined satellite navigation signal input to facilitate separating each of said plurality of signals from said combined signal set and wherein the clock rate used to subsequently process each of said plurality of signals is reduced in response to said separating.

22. The signal processing component of claim 17 wherein said signal filtering component comprises:

at least one filter communicatively coupled with said signal processing pathway for separating at least one of said plurality of signals from said combined signal set; and at least one analog-to-digital converter respectively coupled with said at least one filter for converting said at least one of said plurality of signals to a respective digital signal.

\* \* \* \* \*